United States Patent
Lidgard

[15] 3,704,807
[45] Dec. 5, 1972

[54] SAFETY RELIEF DEVICE

[72] Inventor: Robert J. Lidgard, Hacienda Heights, Calif.

[73] Assignee: Ametek, Inc., New York, N.Y.

[22] Filed: March 8, 1971

[21] Appl. No.: 121,695

Related U.S. Application Data

[63] Continuation-in-part of Ser. No. 881,234, Dec. 1, 1969.

[52] U.S. Cl. ................................220/89 A, 137/68
[51] Int. Cl. ..........................................B65d 25/00
[58] Field of Search.....................220/89 A; 137/68

[56] References Cited

UNITED STATES PATENTS

| 2,523,068 | 9/1950 | Simpson et al. | 220/89 A |
|---|---|---|---|
| 2,548,744 | 4/1951 | Simms | 220/89 A |
| 2,766,904 | 10/1956 | Philip | 220/89 A |
| 2,953,279 | 9/1960 | Coffman | 220/89 A |
| 2,954,897 | 10/1960 | Hansen et al. | 220/89 A |
| 2,980,286 | 4/1961 | Coffman | 220/89 A |
| 3,072,288 | 1/1963 | Lemmer | 220/89 A |
| 3,445,032 | 5/1969 | Raidl, Jr. et al. | 220/89 A |

Primary Examiner—Joseph R. Leclair
Assistant Examiner—James R. Garrett
Attorney—Robert E. Strauss

[57] ABSTRACT

A pre-bulged, frangible member and a relief device employing the frangible member is described. The member has a pre-determined burst pattern that is relieved into its crown which insures that no portion of the member is severed from the member when it fails. The basic pattern uses radial slits extending from the periphery of the crown and terminating short of the center. The center portion of the crown is relieved with a pattern employing at least one non-rupturable, interconnecting web between the apex and the remainder of the member so that, on failure, this web retains the apex of the crown.

8 Claims, 7 Drawing Figures

PATENTED DEC 5 1972

INVENTOR.
ROBERT J. LIDGARD
BY
ATTORNEY

PATENTED DEC 5 1972

INVENTOR.
ROBERT J. LIDGARD
BY
ATTORNEY

SAFETY RELIEF DEVICE

This application is a continuation-in-part of my copending application, Ser. No. 881,234, filed Dec. 1, 1969.

This invention relates to safety relief devices and, in particular, relates to such devices that utilize at least one pre-bulged, frangible member having a pre-determined burst pattern and to the frangible member itself.

The safety relief devices comprise flange members with communicating inlet and outlet ports that define a passageway through the device with a sealing diaphragm across the passageway. The sealing diaphragm is supported on the downstream side by a prebulged, frangible member referred to as a rupture member and/or on the upstream side by a similar frangible member, referred to as a vacuum support. By cutting or scoring a burst pattern into the fr angible member, the relief pressure of the member can be controlled more accurately than is possible with unrelieved members. A popular pattern that has been used employs radial slits that extend from the periphery of the crown of the member towards the apex. When the center or apex of the crown is solid as described in U. S. Pat. No. 2,953,279, this apex is frequently severed from the member when it burst and is discharged from the device, creating a potential safety hazard or flow obstruction. One solution to this problem that has been proposed in U.S. Pat. No. 3,445,032 removes the entire apex from the member with a central aperture. The periphery of the central aperture is spaced closer to the inner ends of the radial slits than these ends are spaced to each other, thereby insuring that the slits will be torn radially inwardly to the center and not form any loose pieces.

While the latter device eliminates the severed apex portion and problems associated therewith, the central aperture in the frangible members creates new problems. The sealing diaphragm frequently used in the devices is a plastic sheet or film which requires support over substantially its entire area. When the central aperture is present in the frangible support member, the plastic can extrude through the central aperture. This extrusion can cause the plastic to fray against the sharp edges of the central aperture as it extrudes into and collapses from the aperture with fluctuating system pressure, resulting in premature failure and erratic performance of the relief device. A similar problem occurs when the members with central apertures are used for vacuum supports in that reversals of pressures can cause the plastic diaphragms to extrude inwardly. Even when metallic diaphragms are used, the central aperture can cause erratic behavior by promoting fatigue failure of the diaphragm about the central aperture.

It is an object of this invention to provide a relief device that fails without releasing fragments downstream.

It is a further object of this invention to provide such a device that can be used under flucuating pressure conditions with confidence and reliability.

It is also an object of this invention to provide frangible members with pre-determined burst patterns that can be used in such relief devices as rupture members or as vacuum supports.

Other and related objects will be apparent from the following disclosure.

The preceding objects are attained by this invention which comprises a frangible member and a relief device employing such a frangible member wherein the frangible member has a predetermined burst pattern that has at least one non-frangible web interconnecting the apex of the crown to the remainder of the member. Because a substantial portion of the apex remains as an integral part of the member, difficulties with extrusion or fatigue failure of the sealing diaphragm are obviated. No fragments of the member are formed upon failure because the apex of the crown is provided with a pre-determined burst pattern which insures retention of the apex by the non-rupturable web upon failure.

The invention will now be described by reference to the figures, of which:

Figure 1:
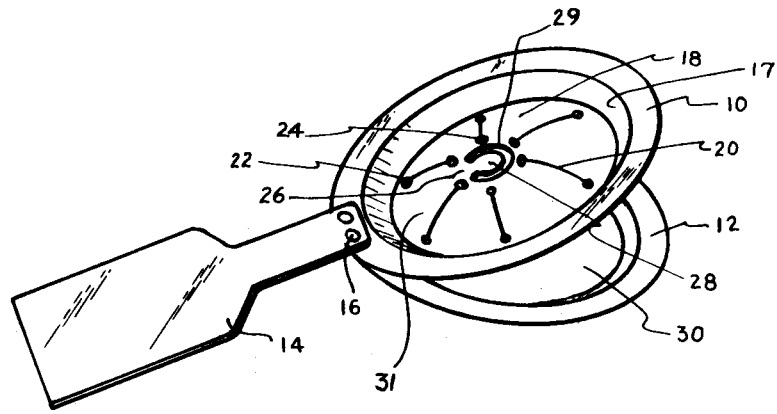
FIG. 1 illustrates an assembly of a frangible member and a sealing diaphragm.

Referring now to FIG. 1, there is illustrated an assembly of a frangible member used as a rupture member 10 with a metallic sealing diaphragm 12 which has a mating shape to nest against the underside of the rupture member 10. The thickness of this member can vary considerably between about 0.5 and about 50 mills, depending on the diameter of the member and on the maximum desired relief pressure. The assembly is retained by rivets 16 which also secure an identifing tag 14 to the assembly. The frangible member 10 has a dished shape with a beveled sidewall 17 and a pre-bulged crown 18. This shape is used to provide a peripheral sealing surface 17 to fit conventional flanges used for the pressure relief devices. It is of course apparent that peripheral sealing surfaces of other shapes and designs can be used as required by the particular flanges used for this device. The shape of the crown can be any arcuate cross section, however, it is generally hemispherical, resulting from the application of sufficient pneumatic pressure to the underside of a solid sheet stock to deform the sheet into the arcuate shape shown. After the crown has been formed in the frangible member, the metal forming the crown is relieved with a pre-determined burst pattern which is cut or scored into the metal of the crown.

The pre-determined burst pattern employs radial fracture lines which are relieved into the metal as grooves that are scored into the metal surface or slits or slots 20 which are cut through the metal. These radial fracture lines extend from the base or periphery of the crown 18 towards the center or apex of the crown. Alternatively, rows of closely spaced apertures can be used to define the fracture lines. For ease in fabrication, slits are used and the slits extend between apertures 22 and 24. The apertures are not necessary to functioning of the member but facilitate fabrication. These apertures can be precisely oriented on the crown to provide the desired rupturing characteristics of the member more readily than can be achieved with conventional means for slitting the crown.

The inner ends of the slits terminate in a circular row of apertures 24 which are, preferably, symetrically placed about the apex of the crown. The apex of the crown is not solid but is provided with a burst pattern which insures that the apex will be retained by the member after rupture. This pattern employs at least one non-rupturable web 28 and, in the FIG. 1 embodiment, is formed by an arcuate slot 29 that extends through a circular arc of about 200° to 310°. Preferably, the slot 29 terminates on the radial extensions of two adjacent slits 20. In the illustrated embodiment, which uses six equally spaced slits, the web 28 therefore has a width of 60° and the arcuate slot 29 is continuous through an arc of 300°. The outer periphery of the arc 29 is spaced in proximity to the inner circular row of apertures 24. The spacing to these apertures should be less than the spacing between the apertures 24 so that the member will rupture inwardly along radial lines between the apertures and the arcuate slot 29. The length of this rupture line, i.e., the proximity of the ends of the slits or their apertures 24 to the arcuate relief slot about the apex, is determined by the desired relief pressure of the member In typical applications, this spacing is from about one-sixteenth to one-eighth of an inch.

Figure 2:
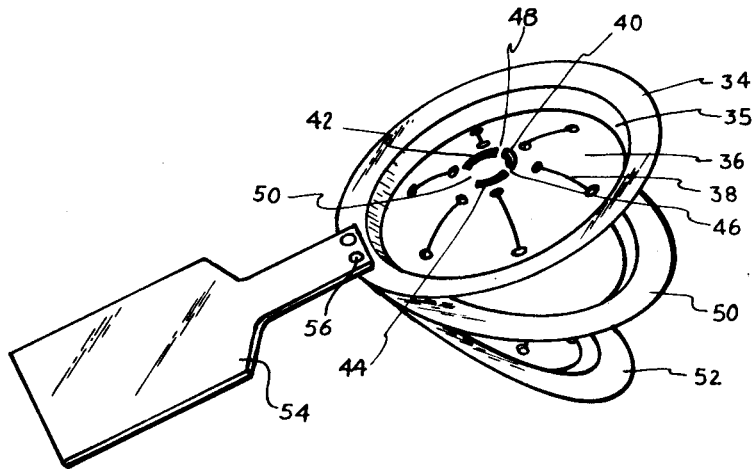
FIG. 2 illustrates an assembly of a frangible rupture member, a sealing diaphragm and a frangible vacuum support.

FIG. 2 illustrates an assembly which has three members. These are the rupture member 34, sealing diaphragm 50 and vacuum support 52 which are retained in assembly by rivets 56 that also secure an identifing tag to the assembly. The basic configuration of the members is similar to that described in FIG. 1 with a dished shape having a beveled sidewall 35 connecting the crown to an outer flange, with the sidewall 35 functioning as the peripheral sealing flange. The crown 36 of the rupture member has radial slits 38 extending between a peripheral row of apertures and a central circular row of apertures about the apex of the crown. The burst pattern in the crown is slightly different than that shown in FIG. 1 in that the pattern uses a plurality of arcuate slots that arc through a continuous 140 to about 25°. As illustrated, the device uses three arcuate slots with each slot extending through an arc of about 80 to 85 degrees with webs 46 and 48 having widths of about 5 to 20 degrees between the slots 44 and 40 and between slots 42 and 40, respectively. The web 50 is the non-rupturable web and has a greater width than the rupturable webs 46 and 48. As illustrated, this web has a width of about 60 degrees. While the device has been illustrated with three arcuate slots which are preferably of equal length, it is apparent that the number and lengths of these slots can be varied as desired provided that at least one non-rupturable web is defined between the center apex and the remainder of the crown.

The remainder of the assembly comprises a sealing diaphragm 50 which can be formed of plastic or of thin sheet metal. When rigid material is used to construct the sealing diaphragm, this member is provided with a shape to mate with and nest within the concave side of the member 34 so that the rupture member 34 supports the sealing member against the system pressure. To prevent pressure flucuations from collapsing the sealing member inwardly, a second support member 52 is provided. This member can be a vacuum support with a conventional burst pattern such as shown in U.S. Pat. No. 2,523,068 or can be provided with a burst pattern similar to that of the frangible members of this invention. It is preferred to use the patterns of this invention which provide support over the entire area of the diaphragm and which do not release any fragments upon failure. Accordingly, the burst pattern of the vacuum support, while not shown in the FIG. 2, is preferably the same as that of the rupture member 34.

Figure 3:
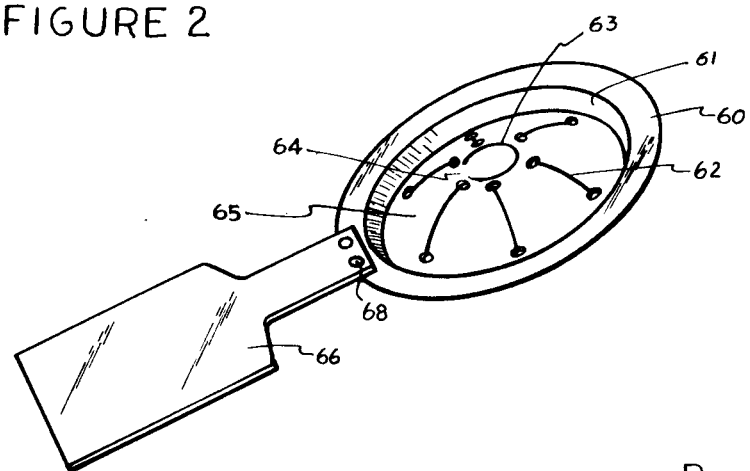
FIG. 3 illustrates a frangible member using an alternative apex relief pattern.

FIG. 3 illustrates a frangible member 60 which can be either a rupture member or can be a vacuum support. This also illustrates yet another pattern in accordance with this invention. This pattern is provided in a member having the conventional configuration with a beveled sidewall 61 connecting the peripheral flange with the crown. The crown has the radially extending slits 62 which terminate in a circular row of apertures symmetrically spaced about the apex of the crown. The apex of the crown is scored with arcuate groove 63 which weakens the metal along this arc and thereby provides a pre-determined path for the rupture of this member. This arcuate groove 63 can be scored through an arc of from about 200 to about 310 degrees in the manner previously described with regard to FIG. 1 so that a non-rupturable web 64 is formed which serves to retain the apex to the sector portion 65 upon rupture of the member. In a similar manner, the arcuate slots 40, 42 and 44 shown in FIG. 2 can be replaced with grooves that are scored into the surface of the metal, thereby relieving the metal to define lines of pre-determined stress failure about the apex.

Figure 4:
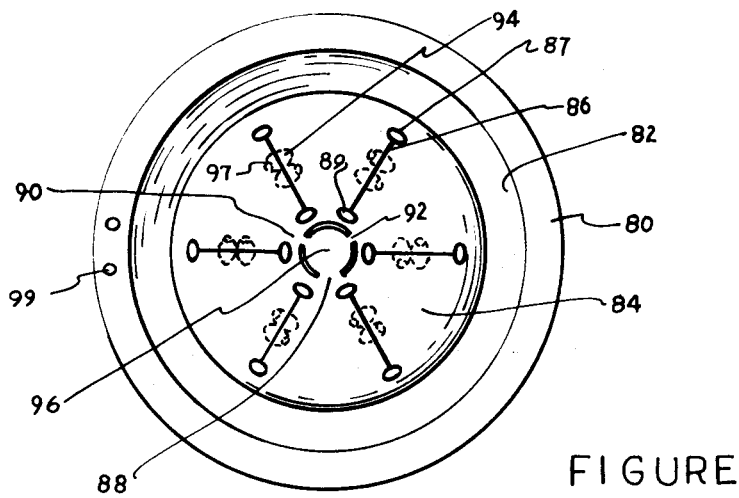
FIG. 4 illustrates a frangible member useful as a vacuum support.

FIG. 4 illustrates a view of the upper surface of a frangible member as it is used for a vacuum support. This member has the apex burst pattern similar to that of FIG. 2 with radial slits 86 extending between a peripheral row of apertures 87 and 89. The arcuate slots about the apex 96 provide webs 90 and 92 which have a thickness less than web 88 so that web 88 is a non-rupturable web while webs 90 and 92 will rupture upon failure of the member. The thickness of the webs and spacing of the slots is similar to that previously described with regard to FIG. 2. The underside of the vacuum support is provided with circular reinforcing members 94 which are secured in a position to overlay the slits 86 and thereby reinforce these slits. The reinforcing members 94 can be secured by any conventional manner, e.g., spot welds 97. Preferably, each slit is provided with a pair of members 94 as shown and, also preferably, each of this pair of members is secured to an opposite sector section of the member by welds 97.

Figure 5:
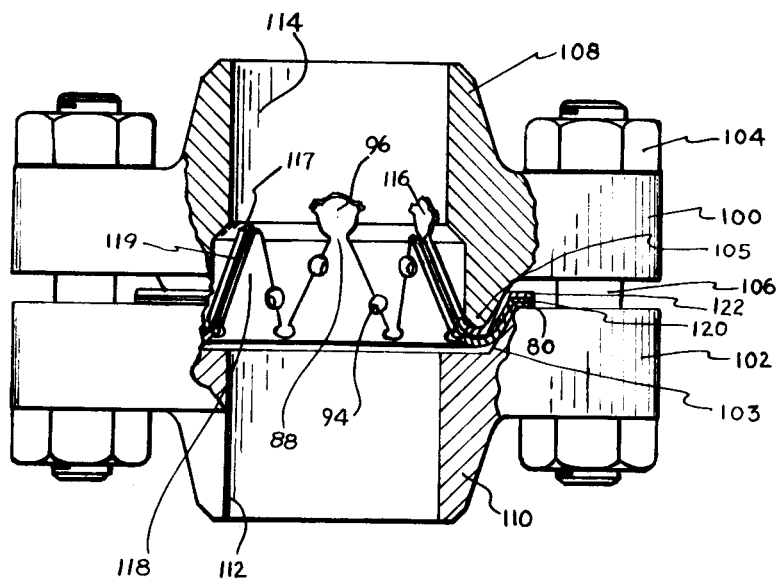
FIG. 5 illustrates a typical assembly after failure.

FIG. 5 illustrates the assembly of a rupture member, sealing member and a vacuum support between mounting flanges and after rupture of the members. This assembly includes flanges 100 and 102 which are retained by bolts 106 and nuts 104. As shown, the flanges support conventional bosses 108 and 110 for welded connection to system piping. The central bores 112 and 114 through the flanges form, respectively, the inlet and outlet of the device. The flange 102 has a beveled counterbore 103 which forms a seat for the beveled sidewall of the assembly of frangible members and sealing diaphragm. The underside of flange 100 has a tapered, central boss 105 which extends into and mates with the counterbore 103 and thereby retains the assembly of frangible members and the sealing member in a fluid tight fit with the flanges. It is of course apparent that other sealing configurations can be used as desired. The devices could be provided with any peripheral sealing flange that fits the flanges of the particular pressure equipment.

The rupturable assembly comprises a vacuum support 80 such as shown in FIG. 4, a sealing member 120 and a rupture support 122. The ruptured members are shown with dilated sectors such as 118 of the vacuum support and 117 of the rupture member with torn sectors 119 of the sealing diaphragm between these sectors. The circular reinforcing members 94 are shown retained by spot welds 97 to their respective sector leaves of the vacuum support. The apex 96 of the vacuum support is shown as retained by the non-rupturable web 88 to one of the sector leaves of the ruptured vacuum support while the apex 116 of the rupture member is retained by a similar sector leaf of the rupture member 122. Webs 90 and 92 shown in FIG. 4 appear as torn ears on the apex 96 after rupture.

The entire assembly of the rupture members can then be seen to have been retained after rupture without the formation of any fragments that would otherwise have been propelled downstream by the force of the pressure release through the device. Importantly, this result is obtained without the removal of the apex from the frangible members. Instead, the apex is present in the members and serves to support the diaphragm during use.

Figure 6:
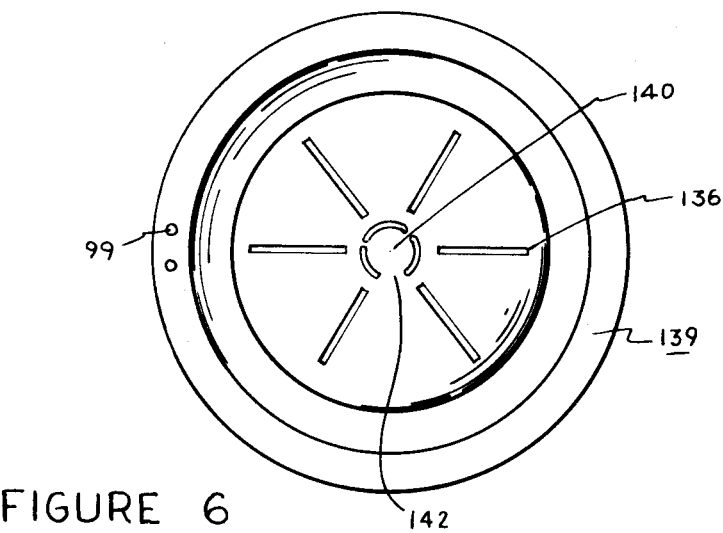
FIGS. 6 and 7 illustrate another embodiment of the invention.
Figure 7:
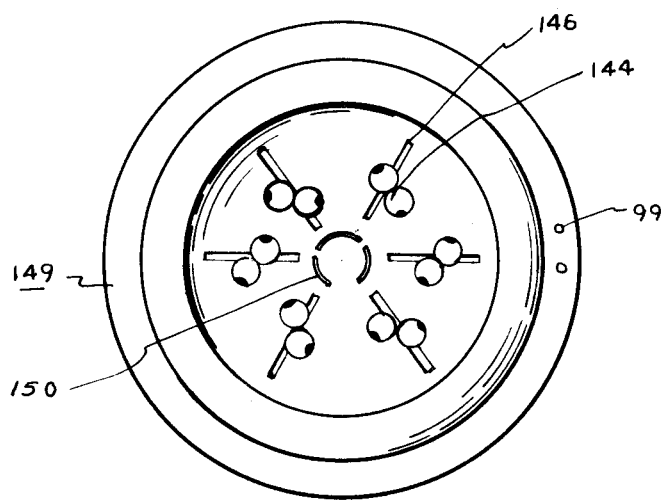

FIGS. 6 and 7 illustrate the use of slots as the crown fracture lines that extend radially across the crown portion of the frangible members. As previously mentioned, these lines can be slits or slots. FIG. 6 shows the rupture member 139 with apex 140 surrounded by arcuate slots that define several webs. Web 142 is substantially wider than the other webs and is the non-rupturable web that functions to retain the apex 140 upon rupture. The assembly of rupture member 139, sealing diaphragm and vacuum support is maintained by rivets 99. FIG. 7 illustrates the underside of the assembly with a vacuum support 149 which is formed to nest against the diaphragm and rupture member 139. This vacuum support has similar radial slots 146 and arcuate slots 149. Conventional reinforcing members 144 are attached to the vacuum support in the manner previously described.

While the invention has been described by reference to specifically illustrated embodiments, it is not intended that such illustration unduly limit the invention. Instead, it is intended that all elements disclosed herein, and each equivalent thereof, be within the scope of the invention.

I claim:

1. A frangible support member for use in a frangible diaphragm relief device which member comprises a thin metal disc having a peripheral sealing flange for engagement between flanges of said device and a central crown portion with an arcuate diametrical cross section said crown portion having a base, an apex portion and a burst pattern comprising fracture lines relieved into the metal of the crown portion and extending across the base portion of the crown from the periphery of the crown radially inwardly towards the apex of the crown and terminating in close proximity to an apex fracture line relieved into the metal and extending partially about the apex of said crown through an open arc providing at least one non-rupturable and non-relived web portion between said apex and said base portions of said crown to thereby retain said apex to said base upon rupture of said member.

2. The member of claim 1 wherein said fracture lines comprise radial slits extending through the entire thickness of said metal disc and with their ends terminating in circular apertures also extending through the entire thickness of said metal disc.

3. The member of claim 1 wherein said apex fracture lines comprise an arcuate slot through said metal disc extending through a continuous open arc from 200° to about 310°.

4. The member of claim 2 wherein said apex fracture lines comprise a plurality of arcuate slots spaced along an open arc of from 200° to 310° with narrow, unrelieved webs spaced between said slots.

5. The member of claim 1 wherein said member has a first circular row of apertures spaced circumferentially about the base portion of said crown and a second circular row of an equal number of apertures circumferentially spaced about the apex of said crown with a continuous slit through said metal extending radially from each aperture in the first row of apertures to a corresponding aperture in the second row of apertures.

6. The member of claim 1 in combination with an imperforate member having a central crown with a mating arcuate diametrical cross section nesting against the concave side of said frangible support member.

7. The combination of claim 1 in further combination with a second frangible support member nesting against the concave side of said imperforate member and having a central crown with a mating arcuate diametrical cross section and a bursting pattern relieved into its crown.

8. The member of claim 1 wherein said fracture lines comprise radial slots extending through the entire thickness of said metal disc.

* * * * *